July 29, 1952  K. C. GAYNOR  2,605,007
TRANSPORTATION SYSTEM
Filed March 29, 1950  3 Sheets-Sheet 1

INVENTOR.
Keyes C. Gaynor
BY Louis O. French
Att'y.

July 29, 1952　　　　　　　　K. C. GAYNOR　　　　　　　　2,605,007
TRANSPORTATION SYSTEM

Filed March 29, 1950　　　　　　　　　　　　　　　3 Sheets-Sheet 2

INVENTOR.
Keyes C. Gaynor
BY Louis O. French
Att'y.

July 29, 1952     K. C. GAYNOR     2,605,007
TRANSPORTATION SYSTEM

Filed March 29, 1950     3 Sheets-Sheet 3

INVENTOR.
Keyes C. Gaynor
BY Louis O. French
Att'y.

Patented July 29, 1952

2,605,007

UNITED STATES PATENT OFFICE 2,605,007

TRANSPORTATION SYSTEM

Keyes C. Gaynor, Sioux City, Iowa

Application March 29, 1950, Serial No. 152,587

4 Claims. (Cl. 214—38)

The invention relates to a transportation system and more particularly to a system for loading and unloading and transporting automobile trucks on rail cars.

The object of the invention is to provide a transportation system in which the loading of the trailer truck onto a rail car at one rail terminus and its unloading at another terminus is facilitated and simplified by the use of a loading platform at each rail terminus having a rail approach and a vehicle approach at different elevations so that a railcar may be moved onto the platform from its approach and the trailer vehicle run onto or off of the top of the railcar on the platform, the platform provided with trailer lowering and raising means which for loading permits the trailer running gear to be lowered in pits in the railcar and its body resting on the top of the railcar in a fixed position and for unloading raises the trailer from its fixed position so that it may be run off from the top of the railcar. As the raising and lowering mechanism is mounted in the terminus platform, the construction of the railcar is greatly simplified and a great saving is effected over the system shown in my prior U. S. Patent No. 2,489,024, dated November 22, 1949, wherein each railcar is provided with means for raising and lowering the trailer truck relative to said railcar. Where it is desired to carry two trailer trucks on a single railcar, the loading platform is a turntable which permits loading the railcar with a trailer truck at one end and then turning the platform and loading the other trailer truck onto the other end of the railcar.

The invention further consists in the several features hereinafter set forth and more particularly defined by claims at the conclusion hereof.

Figure 1:
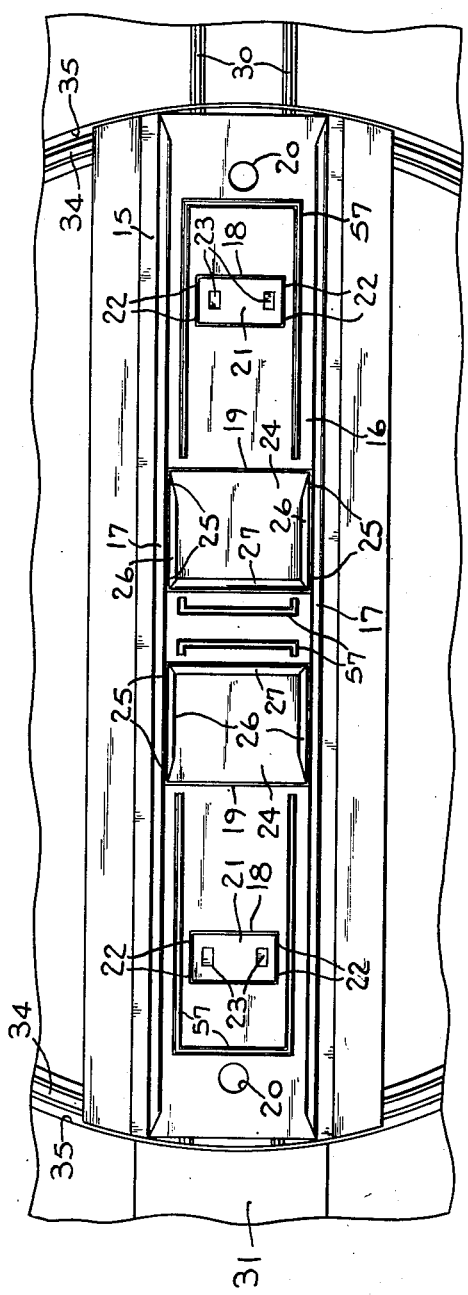
Fig. 1 is a plan view of parts of the apparatus embodying the invention.
Figure 2:
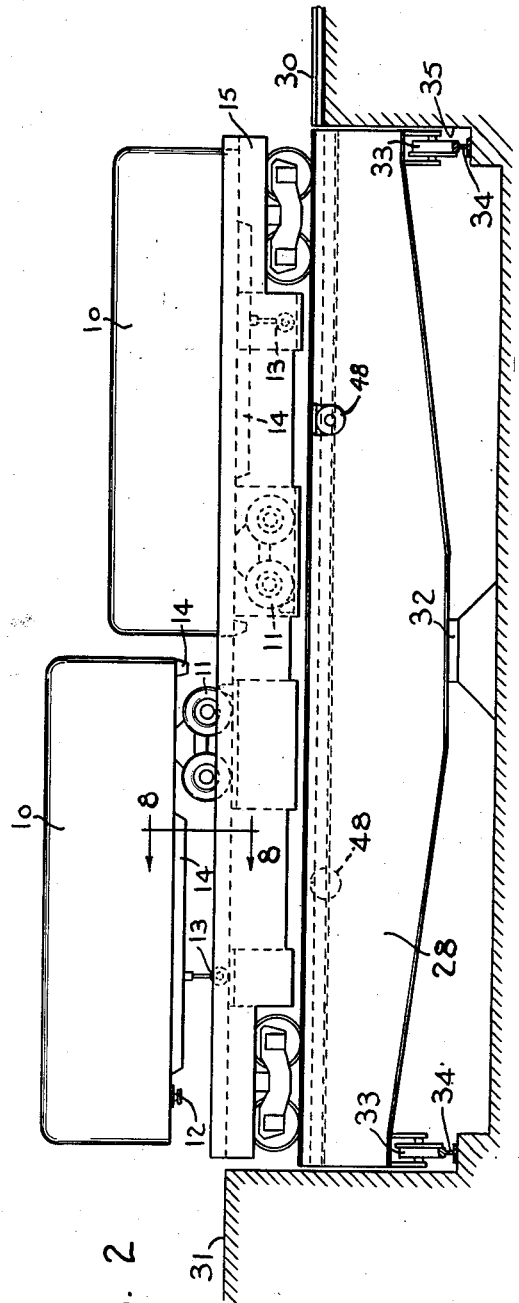
Fig. 2 is a side elevation view of the apparatus, the approaches being shown in section.
Figure 3:
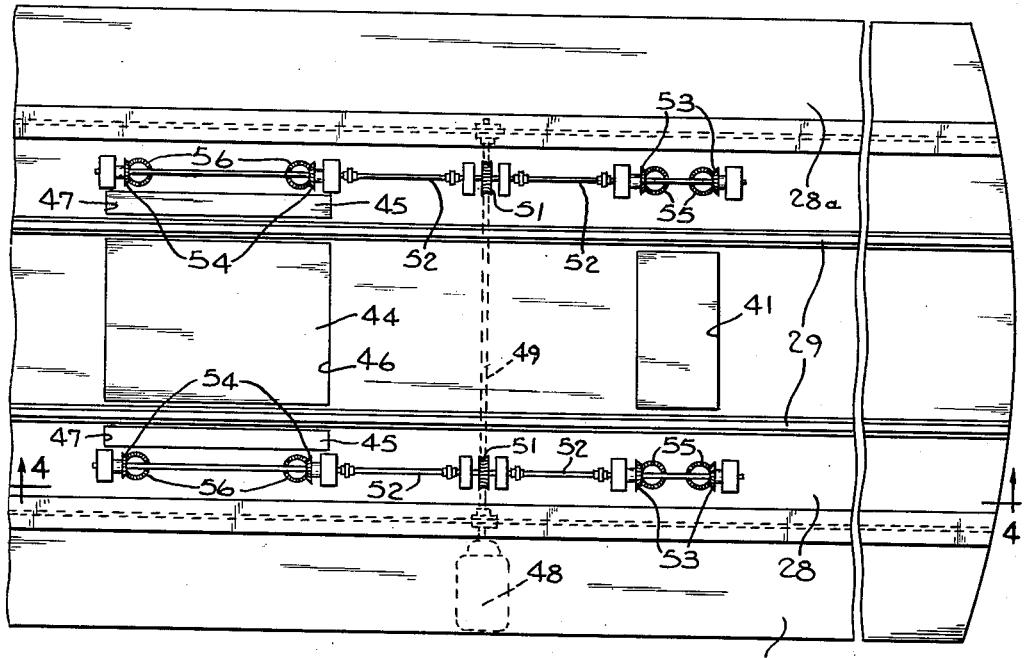
Fig. 3 is a top plan view of a portion of the loading and unloading platform, parts being broken away.
Figure 4:
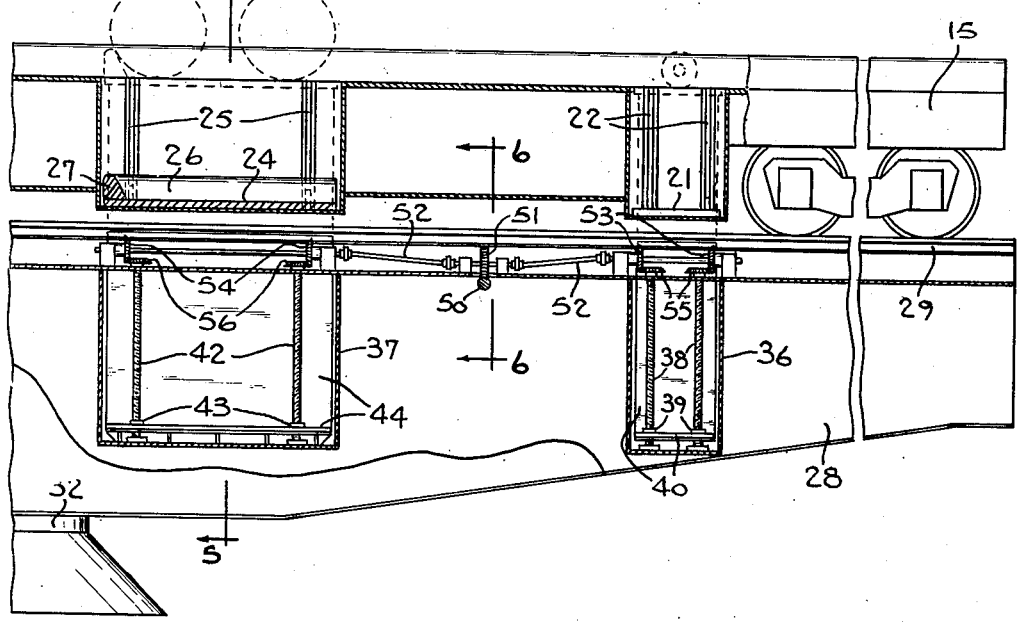
Fig. 4 is a vertical sectional view taken on the line 4—4 of Fig. 3.
Figure 5:
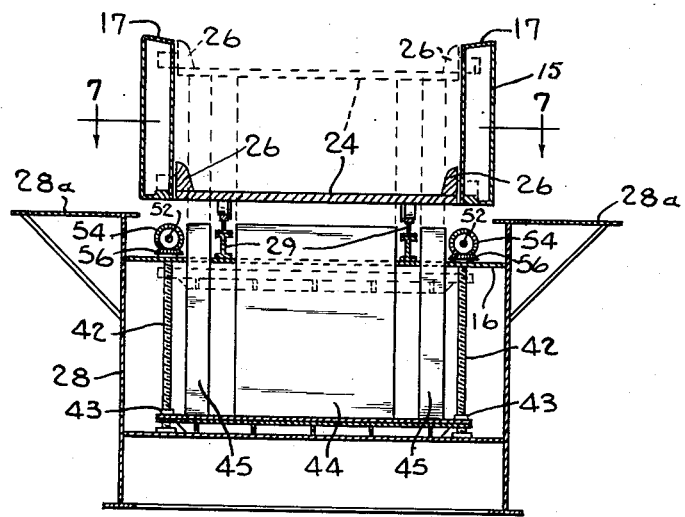
Fig. 5 is a detailed vertical sectional view taken on the line 5—5 of Fig. 4.
Figure 6:
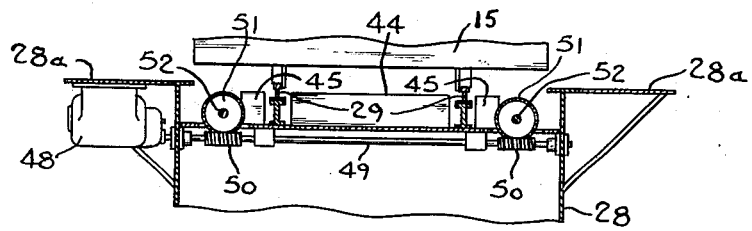
Fig. 6 is a detailed vertical sectional view taken on the line 6—6 of Fig. 4.
Figure 7:
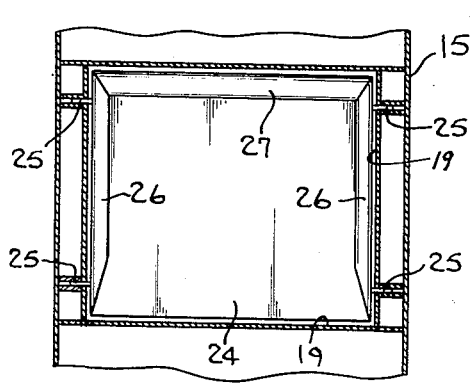
Fig. 7 is a detailed horizontal sectional view taken on the line 7—7 of Fig. 5.
Figure 8:
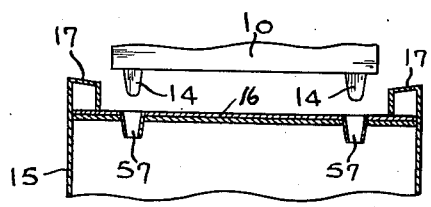
Fig. 8 is a detailed vertical sectional view taken on the line 8—8 of Fig. 2.

Referring to Figs. 2 and 8, the numeral 10 designates an automobile trailer or trailer truck which is preferably of the type having rear wheels 11, a front king pin 12, and the usual foldable front landing gear wheels 13, said truck being of the type for the mounting of the pin 12 in the fifth wheel of a tractor truck, so that the trailer truck may be moved thereby. Unlike the ordinary trailer truck, the truck 10 is also preferably provided with tapered ribs 14 at its sides and at least at one end which depend below the bottom of the body of the truck.

The railcar 15, such as a so-called flat car, may be of a length to carry a single trailer truck or of a length to take two trailer trucks, the latter being shown.

The railcar 15, if of the flat car type, has a flat top 16 provided with side rails 17 running substantially the length of the car and with sets of wheel pits 18 and 19. The wheel pits 18 receives the front landing gear wheels 11 and the wheel pits 19 the rear wheels 11 of the trailer trucks and depressions 20 receive the king pins 12 of said trucks.

The wheel pits 18 each may have an elevator platform 21 mounted for vertical sliding movement in guides 22 and may have one or more sets of landing wheel receiving depressions 23.

The wheel pits 19 each may have an elevator platform 24 mounted for vertical sliding movement in guides 25 and may have side rails 26 and a stop rail 27.

At each rail terminus of the system a loading and unloading structure is provided including a flat top platform 28 having rails 29 which connect at one point with rails 30 of a railroad siding, so that a rail car 15 may be driven onto or off of said platform. A highway approach 31 leads to the platform 28 at another point and is at a higher elevation than the rail approach and at a height which permits driving a trailer vehicle 10 from this approach onto the top 16 of the car 15. Where as is here shown, the car 15 takes two trailer vehicles 10, the platform 28 is in the form of a turntable supported at its central portion on a suitable pivot support 32 and at its outer portion carrying wheels 33 mounted on curved rails 34, the platform being disposed in a pit or excavation 35. With this arrangement turning of the platform 28 relative to the approach 31 permits first one and then the other of the trucks or vehicles 10 to be backed into position upon the flat car 15, so that the rear wheels 11 of each truck will be disposed over the wheel pits 19 and the wheels 13 over the pits 18, said wheels resting on the platforms 24 and 21 associated with these pits when said platforms are in their raised position.

For raising and lowering the platforms 21, the loading and unloading platform 28 has elevator pits 36 and 37 at each end for the platforms 21 and 24, respectively. Each pit 36 has spaced pairs of spaced vertically disposed, rotatable jack screws 38 mounted therein and nuts 39 carried by a platform elevator frame 40 are mounted on these jack screws, which platform is movable through an opening 41 in the top of said platform 28 between the rails 29. Each pit 37 has spaced pairs of spaced vertically disposed, rotatable jack screws 42 mounted therein and nuts 43 carried by a platform elevator frame including a central member 44 and side members 45 are mounted on these jack screws, said members 44 and 45 being movable through openings 46 and 47 in the top of the platform between and at opposite sides of the rails 29.

The jack screws 38 for the frame 40 which raises and lowers one of the platforms 21 and the jack screws 42 for the frame 44, 45 which raises and lowers the associated platform 24 whereby one of the trailer vehicles may be raised and lowered relative to its carrying railcar 15 are driven through suitable shafts and gearing connections by a reversible electric motor 48 mounted on the platform 28.

Referring to Figs. 3 to 6, the drive shaft of the motor 48, which may be a geared head motor, is coupled to a shaft 49 extending transversely of the loading platform 28 and suitably journalled therein and provided with spaced worms 50 which mesh with worm wheels 51 on shafting 52 journalled at opposite sides of said platform 28. Each of the shafts 52 carries spaced sets of bevel gears 53 and 54. The bevel gears 53 mesh with bevel gears 55 fixed to the jack screws 38 while the bevel gears 54 mesh with bevel gears 56 fixed to the jack screws 42.

The platform may have catwalks 28a at the sides thereof from which the motors 48 are suspended. With this arrangement turning of the motor 48 in one direction simultaneously turns the jack screws 38 and 42 to move the frames and the platforms 21 and 24 associated therewith in one direction, for example, to raise the platforms 21 and 24 to a vehicle loading position and turning of said motor in the opposite direction turns the jack screws 38 and 42 to lower the platforms 21 and 24 and thus lower the trailer vehicle down into a position on the top of the flat car where its ribs 14 engage in complementary depressions 57 in the top portion of said railcar, so that said ribs interlock therewith, said ribs and depressions preferably being tapered to insure a proper alinement between the ribs and said depressions as the trailer truck is lowered to a carrying positions. Suitable holddown clamps between the truck and the railcar may also be provided.

With the above construction, a railcar is backed from the siding rails 30 onto the rails 29 of the loading and unloading platform 28 into a position where its pits 18 and 19 aline with the elevator frames 40 and 44, 45. The motor 48 at that end of the platform, which is then alined or may be alined with the highway approach 31, is then operated to raise the elevator frames 40 and 44, 45 at this end of the platform so as to bring the platforms 21 and 24 in the railcar to a level with the top thereof. The trailer vehicle is then backed onto the railcar from the approach 31 to a position in which its wheels 11 and 13 rest on the platforms 21 and 24, respectively. The motor 48 is then put into reverse and the platforms 21 and 24 lowered, thus lowering the trailer vehicle to bring its body into interlocked position with the top portion of the flat car. The platform 28 is then turned end for end, and the operations of raising and lowering the platforms 21 and 24 repeated for the second trailer vehicle driven onto the opposite end of the flat car. The loaded flat car is then pulled or driven off of the platform 28 onto the rails 29 to become a part of the train and is carried to its destination, where a similar loading and unloading platform is provided by which the trailer vehicles are unloaded and removed from the flat car and onto a highway approach where they may be coupled to their tractor trucks for haulage to their final destination.

It is also to be noted that another vehicle approach similar to the approach 31 but at right angles thereto may lead to the turntable so that loading of two vehicles on a single flat car may be more speedily effected, since with the two vehicle approaches at right angles to each other, it is only necessary to turn the table through 90° to effect a loading of the two vehicles on the flat car.

I desire it to be understood that this invention is not to be limited to any particular form or arrangement of parts except in so far as such limitations are included in the appended claims.

What I claim as my invention is:

1. In a transportation system for transporting a trailer truck on a flat-type railcar having pits to receive the running gear of said truck and movable members in said pits adapted to engage said running gear, the combination of a platform having rails to receive the railcar, a rail siding connecting with said platform at the rail level thereof, a highway approach to said platform at a level with the top of the railcar on said platform, and elevators mounted in said platform for raising and lowering said movable members to raise and lower the running gear of said truck out of and into the pits on said railcar.

2. In a transportation system for transporting a trailer truck on a flat type railcar having pits to receive the running gear of said truck, the combination of a platform having rails to receive the railcar, a rail siding connecting with said platform at the rail level thereof, a highway approach to said platform at a level with the top of the railcar on said platform, vertically adjustable platforms working in the wheel pits of said railcar, and raising and lowering means in said platform for moving said vertically adjustable platforms to raise and lower the running gear of said truck relative to said wheel pits.

3. The structure as defined in claim 1 in which the rail carrying platform is a turntable with motor driven raising and lowering means at each end thereof for loading and unloading a trailer truck from either end of a flat car provided with wheel pits for said trucks.

4. The structure as defined in claim 2 wherein the raising and lowering means in the rail carrying platform are motor driven elevator frames in which the elevator frame for the rear wheels includes platform raising parts working between and at opposite sides of the rails on said rail carrying platform.

KEYES C. GAYNOR.

REFERENCES CITED

The following references are of record in the file of this patent:

UNITED STATES PATENTS

| Number | Name | Date |
|---|---|---|
| 483,360 | Ludlow | Sept. 27, 1892 |
| 1,594,494 | Callison | Aug. 3, 1926 |
| 1,611,882 | Budd | Dec. 28, 1926 |
| 1,716,588 | Kirchner | June 11, 1929 |
| 2,489,024 | Gaynor | Nov. 22, 1949 |